(12) United States Patent
Ishikawa (10) Patent No.: US 8,113,701 B2
(45) Date of Patent: Feb. 14, 2012

(54) VEHICULAR LAMP

(75) Inventor: Tomomi Ishikawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 286 days.

(21) Appl. No.: 12/548,163

(22) Filed: Aug. 26, 2009

(65) Prior Publication Data

US 2010/0053986 A1 Mar. 4, 2010

(30) Foreign Application Priority Data

Aug. 28, 2008 (JP) ................... 2008-219080

(51) Int. Cl.
*F21S 8/10* (2006.01)

(52) U.S. Cl. ........ 362/545; 362/487; 362/494; 362/498; 362/509; 362/511

(58) Field of Classification Search .................. 362/487, 362/494, 498, 509, 511, 516, 520, 543–545, 362/800

See application file for complete search history.

(56) References Cited

U.S. PATENT DOCUMENTS

2008/0089080 A1 4/2008 Kawaji et al.

FOREIGN PATENT DOCUMENTS

| JP | 2006-164908 A | 6/2006 |
| JP | 2008-094215 A | 4/2008 |

OTHER PUBLICATIONS

English abstract of JP2006164908 published on Jun. 22, 2006, esp@cenet database, 1 page.

*Primary Examiner* — Stephen F Husar
*Assistant Examiner* — Meghan Dunwiddie
(74) *Attorney, Agent, or Firm* — Osha • Liang LLP (57) ABSTRACT

A vehicular lamp has an opening portion extending in a left-right direction provided on a side that wraps around toward a rear of a vehicle on an end side of an outer side wall of a mirror housing that supports a side mirror body has a main lamp body. The vehicular lamp has a lamp body and a front lens. The main lamp body is formed into a shape that generally follows the curved opening portion. The front lens is attached to the mirror housing so as to slightly project from or be on generally the same plane as the opening portion. The vehicular lamp has a surface-emitting light guide inner lens provided along the front lens in a curved lamp chamber space. The lamp chamber space is defined by the lamp body and the front lens. The lamp chamber space is elongated in the left-right direction.

14 Claims, 7 Drawing Sheets

VEHICULAR LAMP

BACKGROUND OF INVENTION

1. Field of the Invention

The present invention relates to a vehicular lamp, such as a side turn signal lamp, that is integrated with a side mirror of an automobile.

2. Related Art

Patent Document 1 is an example of related art for this type of vehicular lamp, and describes a lamp (a side turn signal lamp) in which an opening portion that extends in a left-right direction is provided on a side of a mirror housing that wraps around toward the rear of a vehicle body, with the mirror housing also supporting a side mirror body (not shown). In addition, a front lens of the lamp is fitted to the mirror housing so as to be exposed from the opening portion. A light guide inner lens that emits light using an LED as a light source is provided in a lamp chamber space defined by a lamp body and the front lens of the lamp (side turn signal lamp). The LED used for the light source is structured with a first LED and a second LED. The first LED is provided such that an illumination axis thereof faces diagonally rearward and distributes light diagonally rearward of the vehicle directly without the light passing through the light guide inner lens. The second LED is provided adjacent to and on an inner side in the vehicle width direction of the first LED such that an illumination axis thereof faces diagonally forward and the entire light guide inner lens emits light diagonally forward of the vehicle.

[Patent Document 1] Japanese Patent Application Laid-Open (Kokai) No. JP-A-2006-164908

SUMMARY OF INVENTION

However, according to the above Patent Document 1, the first LED can be seen through the front lens when not lit and worsens the overall appearance.

One or more embodiments of the present invention provide the first LED behind the light guide inner lens that extends along the front lens so as not to be seen through the front lens when not lit. However, this moves the installation position of the first LED rearward, and such movement correspondingly increases the depth of the lamp chamber space (the rearward expansion of the lamp) of the lamp (the side turn signal lamp). As a consequence, the layout becomes constrained in terms of designing (installing) a movable mirror body in the mirror housing.

In view of the above, one or more embodiments of the present invention form a concave portion for providing an LED on a back surface side of the light guide inner lens and provide the LED in the concave portion so as to not move the installation location of the LED rearward. An experimental prototype confirmed the desired effect and led to the filing of this application.

One or more embodiments of present invention provide a vehicular lamp that is thin and has a good appearance when not lit.

In a vehicular lamp with an opening portion extending in a left-right direction is provided on a side that wraps around toward a rear of a vehicle on an end side of an outer side wall of a mirror housing that supports a side mirror body, according to one or more embodiments, the vehicular lamp includes a main lamp body formed with a lamp body and a front lens is formed into a shape that generally follows the curved opening portion; and the front lens is attached to the mirror housing so as to slightly project from or be on generally the same plane as the opening portion. Furthermore, the vehicular lamp includes: a surface-emitting light guide inner lens provided along the front lens in a curved lamp chamber space, wherein the lamp chamber space is defined by the lamp body and the front lens, and wherein the lamp chamber space is elongated in the left-right direction, and an LED used as a light source provided behind the light guide inner lens. The LED is formed from a first LED provided on the curved wrap-around side of the lamp chamber space such that an illumination axis thereof faces diagonally rearward of the vehicle, and a second LED provided adjacent to and on an inner side in a vehicle width direction of the first LED such that an illumination axis thereof faces diagonally forward of the vehicle. A concave portion (notch) for light source installation is provided in an area of the light guide inner lens corresponding to the first and second LEDs, and respectively forms light incident surfaces generally opposite to the first and second LEDs.

The light guide inner lens, which is provided between the front lens and the first and second LEDs used as a light source, prevents the first and second LEDs used as a light source from being directly seen through the front lens when not lit.

The first and second LEDs are provided in the concave portion (notch) for light source installation of the light guide inner lens (the first and second LEDs are provided forward of the back surface of the light guide inner lens). In comparison to when the first and second LEDs are provided along the curved back surface of the light guide inner lens, the installation position of the first and second LEDs is moved forward (closer to the front lens side). Accordingly, the lamp chamber space at the LED installation position does not expand rearward by the movement of the installation position (i.e., the lamp body does not significantly expand into the mirror housing).

A diffuse incident step is formed on the light incident surface of the light guide inner lens corresponding to the first LED. Light emitted from the first LED is distributed as diffused light diagonally rearward of the vehicle through the light guide inner lens functioning as a diffused lens. A diffuse reflecting step is formed on a back surface side of the light guide inner lens extending from the concave portion (notch) for light source installation to an end portion on an inner side in a vehicle width direction. Light emitted from the second LED incident to the light guide inner lens is reflected by the diffuse reflecting step on the back surface side. Thus, the entire light guide inner lens emits light diagonally forward of the vehicle.

According to one or more embodiments, in the vehicular lamp described herein, the light guide inner lens is assembled on a front side of the lamp body, and the light guide inner lens is structured so as to be enclosed by a center opening portion extending in the left-right direction of an extension reflector extending along the front lens. The light guide inner lens is held to the center opening portion by a convex-concave lance engagement between an engagement concave portion formed on an end portion and a peripheral edge portion of the center opening portion. The convex-concave lance engagement occurs when another end portion corresponding to the inner side in the vehicle width direction is engaged with the peripheral edge portion of the center opening portion, and the end portion side is pushed into the center opening portion.

Engaging the end portion of the light guide inner lens, which corresponds to the inner side in the vehicle width direction, with the peripheral edge portion of the center opening portion of the extension reflector, and pushing the other end portion, achieves a convex-concave lance engagement between the engagement concave portion on the other end portion side and the peripheral edge portion of the center opening portion. Accordingly, the light guide inner lens is held to the center opening portion. Releasing the engagement of the convex-concave lance engagement portion on the other end portion side enables easy separation of the light guide inner lens from the center opening portion of the extension reflector.

The entire front side of the extension reflector including an inner surface of the center opening portion is subject to an aluminum vapor deposition process. The light guide inner lens is edged with a band-like, metallic-colored, aluminized frame and seen through the transparent front lens. Thus, an overall appearance of the vehicular lamp is improved when the vehicular lamp is not lit. Light emitted from the back surface side of the light guide inner lens is reflected by the aluminized inner surface of the center opening portion. The reflected light returns to the light guide inner lens, reducing light leakage.

According to one or more embodiments, in the vehicular lamp described herein, a vertical cross section of the center opening portion of the extension reflector and the light guide inner lens is formed into a rectangular shape that is vertically longer toward the front surface side. A lateral rib for positioning in an up-down direction is provided at a predetermined interval in the left-right direction on upper and lower side walls of the center opening portion so as to contact upper and lower side surfaces of the light guide inner lens. A vertical rib for positioning in a front-back direction is provided at a predetermined position in the left-right direction of the center opening portion so as to be engaged with a thin wall portion that defines the concave portion (notch) for light source installation.

The vertical cross section of the center opening portion of the extension reflector and light guide inner lens is formed into a rectangular shape that is vertically longer toward the front surface side, which facilitates mounting (insertion) of the light guide inner lens to the center opening portion.

The lateral rib provided on the upper and lower side walls of the center opening portion contacts the upper and lower side surface of the light guide inner lens. The lateral rib prevents looseness in the up-down direction of the light guide inner lens against the center opening portion. The vertical rib provided in the center opening portion is engaged with (contacts) the thin wall portion, which defines the concave portion (notch) for light source installation of the light guide inner lens, so as to prevent looseness in the front-back direction of the light guide inner lens against the center opening portion.

The light guide inner lens, which is made of synthetic resin, has an elongated shape and is prone to deflection. Therefore, when the lamp is assembled (e.g., when a board holder, which is integrated with circuit boards that are mounted with the first and second LEDs, is assembled to the extension reflector fitted to the light guide inner lens, or when the light guide inner lens is fitted to the extension reflector after the board holder integrated with the circuit boards that are mounted with the first and second LEDs is assembled to the extension reflector), a larger external force (force in the pushing direction) than necessary is applied to the light guide inner lens and causes elastic deformation toward the back surface side in the vicinity of the curved center portion in the longitudinal direction of the light guide inner lens. Accordingly, the light guide inner lens may contact the first and second LEDs provided on the back surface side of the light guide inner lens, and the illumination axes of the first and second LEDs may move. However, a vertical cross section of the light guide inner lens and the center opening portion is formed generally wedge-shaped (which is vertically longer toward the front surface side). In addition, the vertical rib provided in the center opening portion contacts the thin wall portion that defines the concave portion (notch) for light source installation of the light guide inner lens. Therefore, elastic deformation toward the back surface side of the light guide inner lens is securely prevented, and the illumination axes of the first and second LEDs do not move.

According to one or more embodiments, in the vehicular lamp described herein, a circuit board holder that is integrated with circuit boards mounted with the first and second LEDs is further included. The circuit board holder has a generally L-shaped horizontal cross section following the light guide inner lens. The circuit board holder is fitted on a back surface side of the extension reflector, such that the circuit board holder and the extension reflector are integrated as an LED and extension unit. A pair of upper and lower L-shaped tabs is formed on the back surface side of the extension reflector. A pair of upper and lower engagement projections engaged with the tabs is formed on the front surface side of the lamp body. The engagement projections are slidingly engaged with the tabs by sliding the LED and extension unit from an outer side to an inner side in the vehicle width direction of the lamp body such that the LED and extension unit is assembled to the lamp body. Relative sliding surfaces of the extension reflector and the lamp body are provided with a convex-concave engagement portion that is elastically engaged in cooperation with the engagement between the tabs and the engagement projections so as to hold the tabs and the latch projections in an engaged state.

At the same time that the pair of upper and lower L-shaped tabs on the back surface side of the extension reflector is engaged with the pair of upper and lower engagement projections on the lamp body front surface side by sliding the LED and extension unit from the outer side to the inner side in the width of the vehicle of the lamp body, the convex portion (or the concave portion) on the extension reflector side and the concave portion (or the convex portion) on the lamp body side are elastically engaged with one another. Thus, the tabs and the engagement projections are held in an engaged stated (i.e., the LED and extension unit is assembled to the lamp body).

When the elastic engagement of the convex-concave engagement portion between the extension reflector and the lamp body is released, and the LED and extension unit slide from the inner side to the outer side in the vehicle width direction of the lamp body (i.e., slide in the opposite direction to the assembling direction), so that the engagement between the pair of upper and lower tabs on the extension reflector back surface side and the engagement projections on the lamp body front surface side can be easily released.

According to one or more embodiments, in the vehicular lamp described herein, a fastening screw insertion hole is provided in a generally center portion in the longitudinal direction of the circuit board holder, which has a generally L-shaped horizontal cross section. The generally L-shaped circuit board holder is provided with a latch convex portion on an end portion of a curved side thereof. A pair of latch projections projecting outward in the up-down direction is provided at upper and lower positions of the screw insertion hole. A boss, for providing a fastening screw corresponding to the fastening screw insertion hole, is formed projecting from a back wall of the center opening portion on the back surface side of the extension reflector. A latch concave potion is provided for engagement with the latch convex portion on the end portion of the curved side of the generally L-shaped circuit board holder. A horizontal extending portion provided at upper and lower positions of the boss forms a base end portion of the pair of L-shaped tabs. The horizontal extending portion is also provided with a projection engagement hole capable of engaging with the latch projection, and horizontal extending portion is provided with a projection guide groove that extends in the front-back direction and communicates with the engagement hole. The generally L-shaped board holder (a circuit board unit), which is integrated with the circuit boards mounted with the first and second LEDs, is structured so as to be temporarily fixed to the extension reflector by engaging the latch convex portion and the latch concave portion, and engaging the latch projection and the projection engagement hole.

The latch convex portion on the board holder side is engaged with the latch concave portion on the extension reflector side. The board holder is pushed into the extension reflector side so as to align the pair of latch projections to the projection guide grooves. Accordingly, the screw insertion hole matches the boss, and the latch projection slides along the projection guide groove and engages with the projection engagement hole. Therefore, the board holder is integrated with the extension reflector so as to prevent separation from the extension reflector. In other words, the board holder (the circuit board unit), which is integrated with the circuit boards mounted with the first and second LEDs, can be easily temporarily fixed to the extension reflector. Thus, work for threadedly mounting the fastening screw to the boss from the screw insertion hole of the board holder is facilitated, and the LED and extension unit can be easily assembled.

According to the vehicular lamp of one or more embodiments, the light guide inner lens is provided between the front lens and the first and second LEDs used as a light source. Therefore, the first and second LEDs are not directly seen through the front lens. Thus, an overall appearance of the vehicular lamp is improved when the vehicular lamp is not lit.

The first and second LEDs are provided at positions forward of the curved back surface of the light guide inner lens. Therefore, rearward expansion of the lamp body is prevented, and the vehicular lamp is not likely to contact the side mirror body in the mirror housing. Consequently, the layout has more freedom in terms of designing the side mirror components.

According to one or more embodiments, the light guide inner lens can be easily integrated with the extension reflector. Thus, the assembly of the vehicular lamp is facilitated.

According to one or more embodiments, the light inner lens can be held so as to prevent looseness against the extension reflector. Even if the external force in the pushing direction of the light guide inner lens is applied to the external lens, the illumination axes of the first and second LEDs are not displaced.

According to one or more embodiments, the LED and extension unit can be assembled to the lamp body. Thus, the assembly of the vehicular lamp is facilitated.

According to one or more embodiments, the LED and extension unit are easily assembled, and the assembly of the LED and extension unit to the lamp body is made easier by a corresponding amount. Thus, assembly of the vehicular lamp is facilitated.

Other aspects and advantages of the invention will be apparent from the following description, the drawings and the claims.

DETAILED DESCRIPTION

Next, embodiments of the present invention will be described with reference to the figures.

Figure 1:
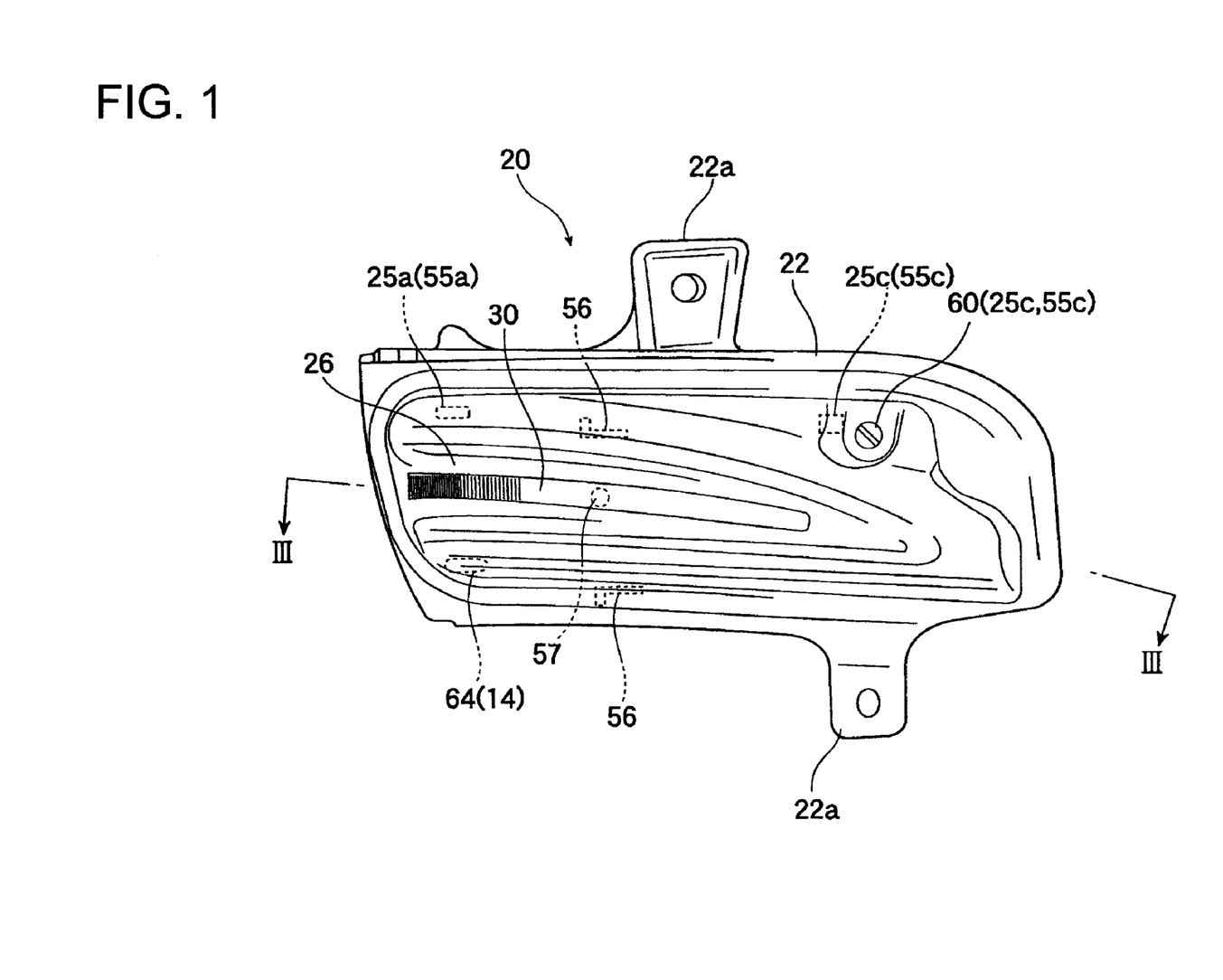
FIG. 1 is a frontal view of a side turn signal lamp according to a first embodiment of the present invention.
Figure 2:
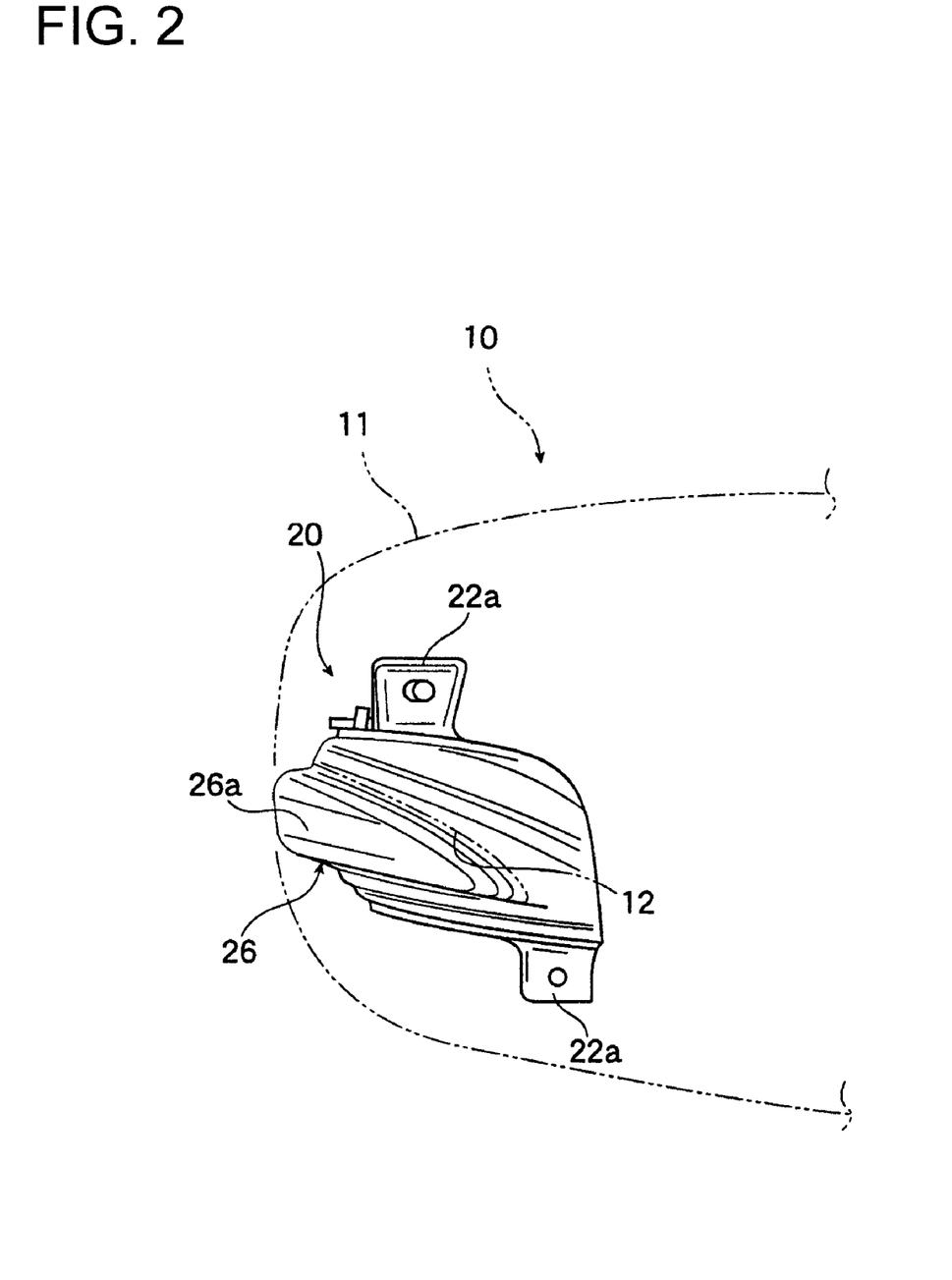
FIG. 2 is a right side view of the side turn signal lamp (a view of the lamp as seen from the front of the vehicle).
Figure 3:
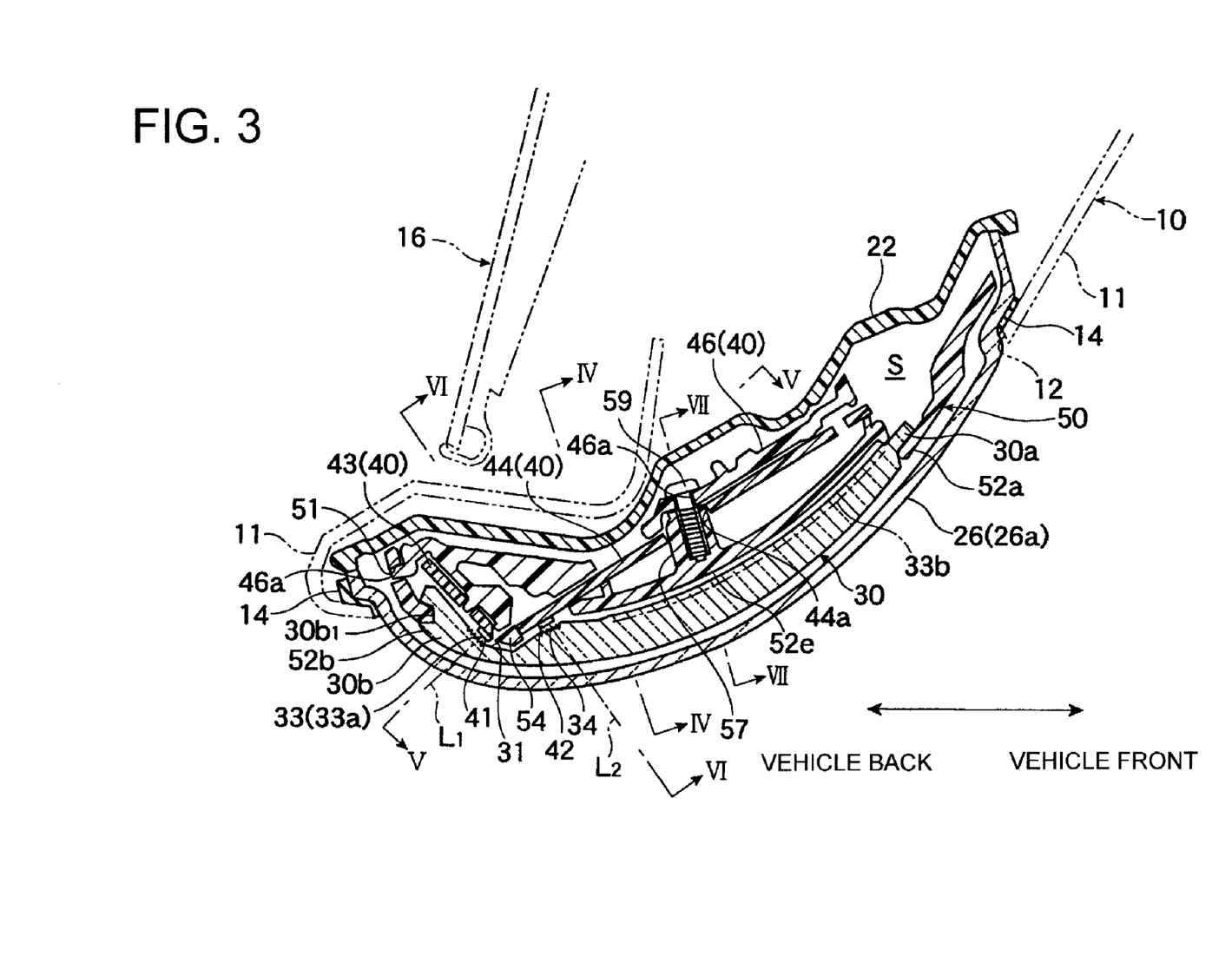
FIG. 3 is a horizontal cross-sectional view of the side turn signal lamp (a cross-sectional view taken along a line III-III in FIG. 1).
Figure 4:
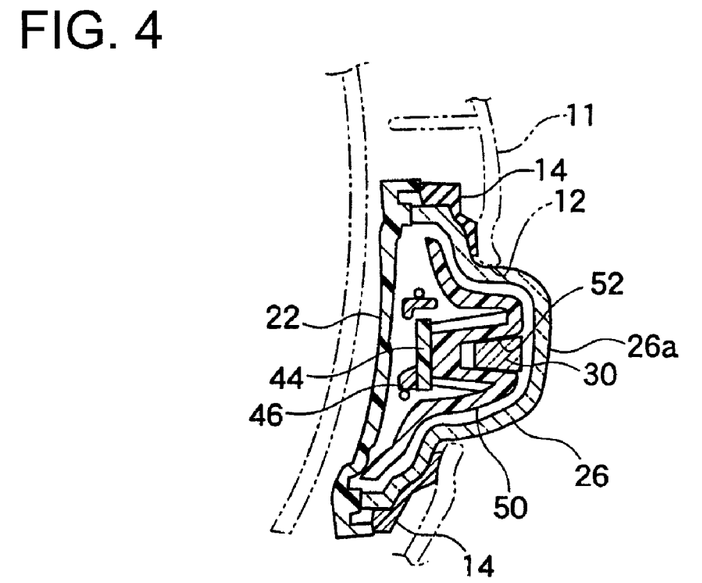
FIG. 4 is a vertical cross-sectional view of the side turn signal lamp (a cross-sectional view taken along a line IV-IV in FIG. 3).
Figure 5:
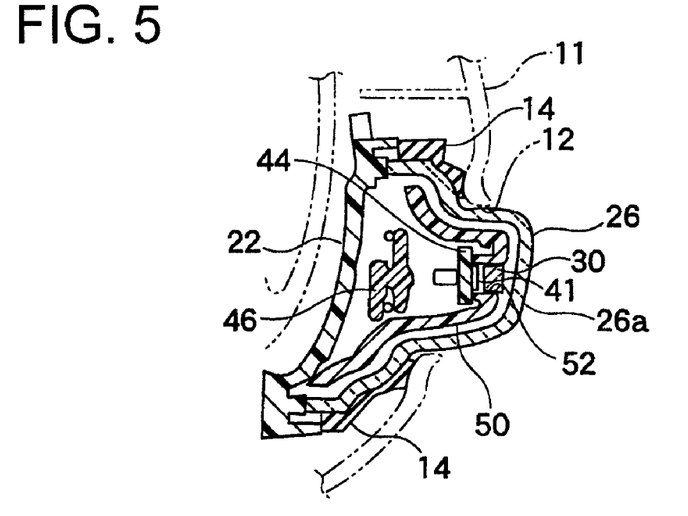
FIG. 5 is a vertical cross-sectional view of the side turn signal lamp (a cross-sectional view taken along a line V-V in FIG. 3).
Figure 6:
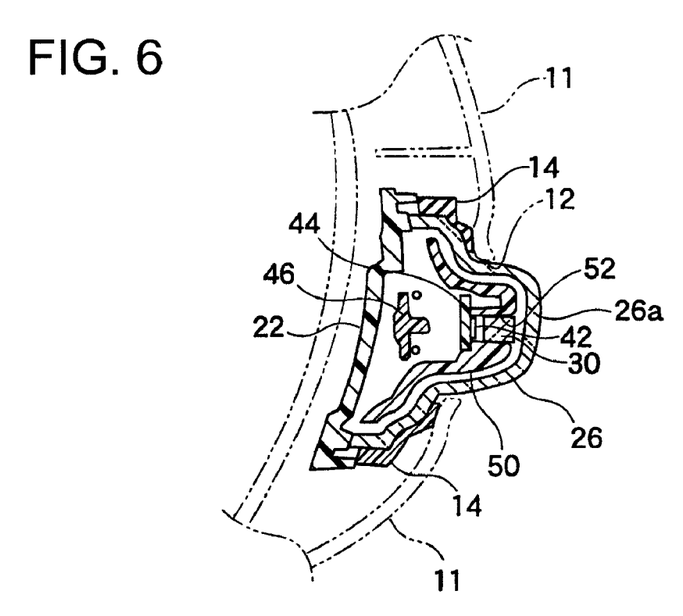
FIG. 6 is a vertical cross-sectional view of the side turn signal lamp (a cross-sectional view taken along a line VI-VI in FIG. 3).
Figure 7:
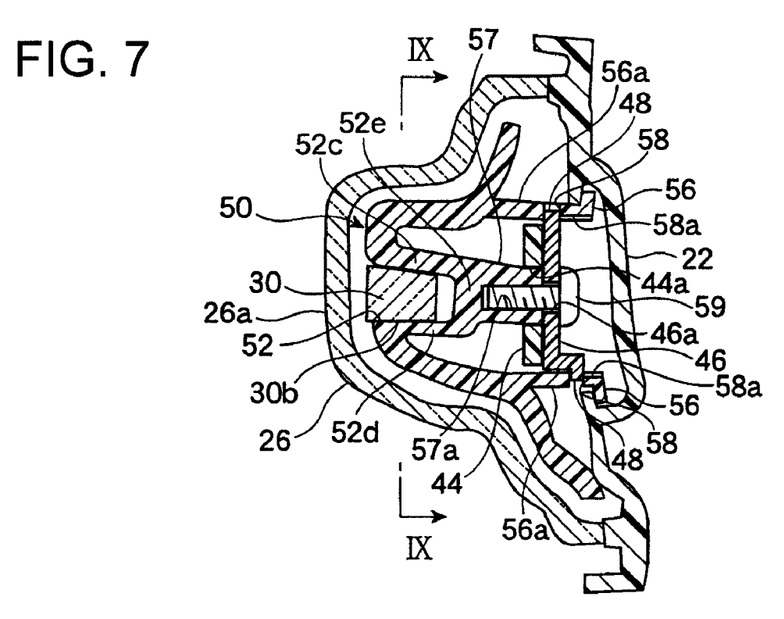
FIG. 7 is an enlarged vertical cross-sectional view of the side turn signal lamp (a cross-sectional view taken along a line VII-VII in FIG. 3).
Figure 8:
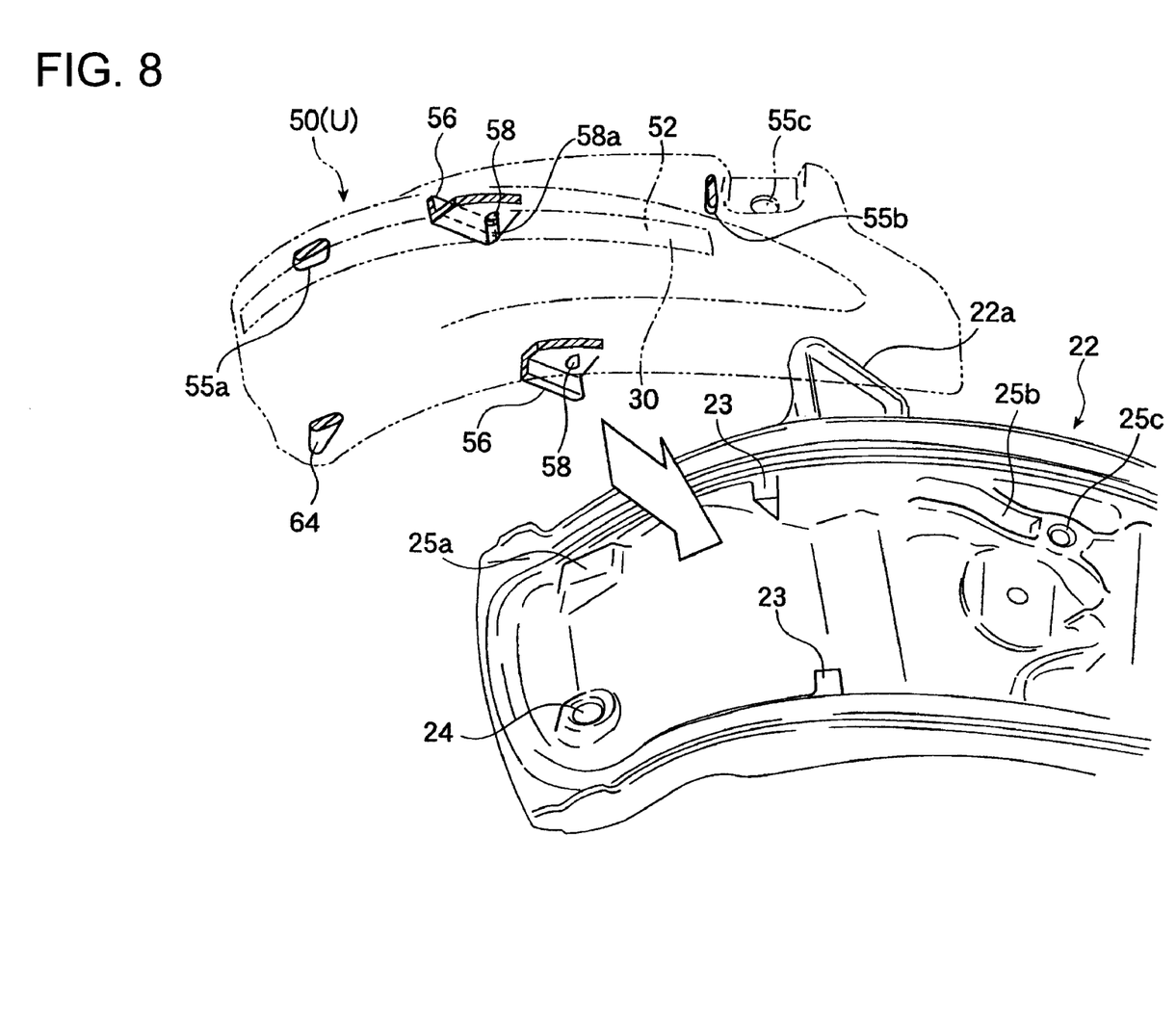
FIG. 8 is an enlarged perspective view showing temporary fixing means between an extension reflector and a lamp body.
Figure 9:
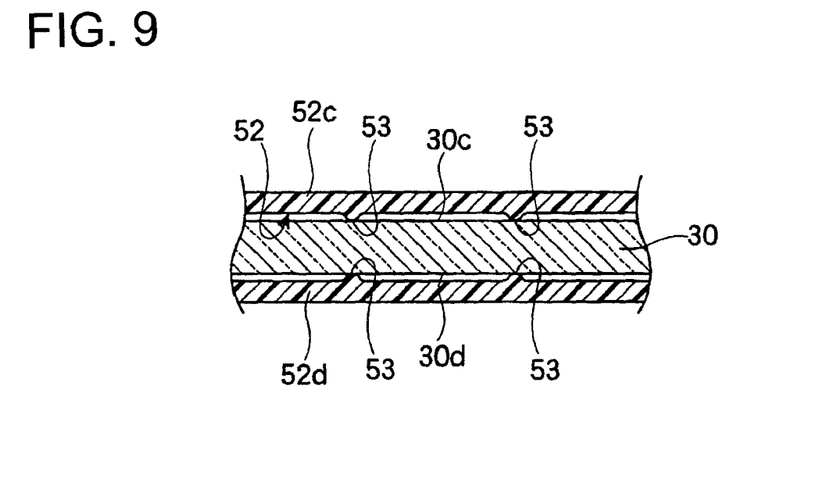
FIG. 9 is a vertical cross-sectional view of the side turn signal lamp (an enlarged cross-sectional view taken along a line IX-IX in FIG. 7).
Figure 10:
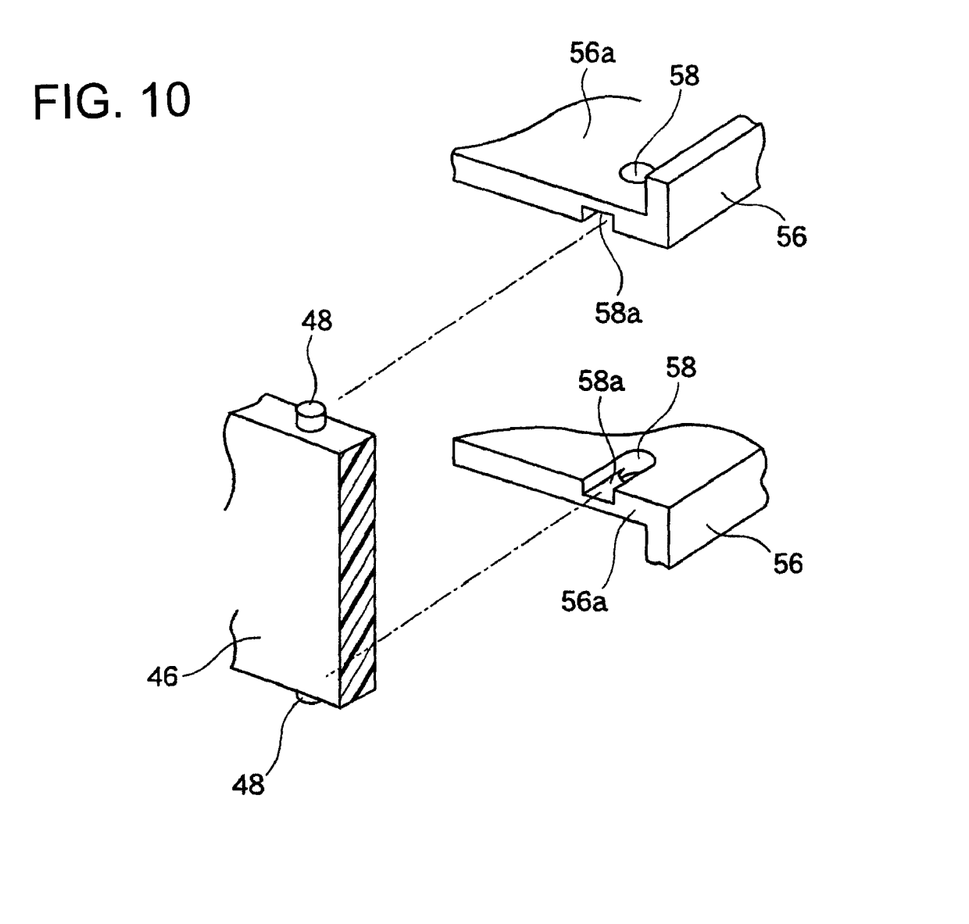
FIG. 10 is an enlarged perspective view showing a latch projection on a board holder side and an engagement hole on the extension reflector side, which are temporary fixing means of a circuit board unit.

FIGS. 1 to 10 show a first embodiment of the present invention. FIG. 1 is a frontal view of a side turn signal lamp according to the first embodiment of the present invention; FIG. 2 is a right side view of the side turn signal lamp (a view of the lamp as seen from the front of the vehicle); FIG. 3 is a horizontal cross-sectional view of the side turn signal lamp (a cross-sectional view taken along a line III-III in FIG. 1); FIG. 4 is a vertical cross-sectional view of the side turn signal lamp (a cross-sectional view taken along a line IV-IV in FIG. 3); FIG. 5 is a vertical cross-sectional view of the side turn signal lamp (a cross-sectional view taken along a line V-V in FIG. 3); FIG. 6 is an enlarged vertical cross-sectional view of the side turn signal lamp (an enlarged cross-sectional view taken along a line VI-VI in FIG. 3); FIG. 7 is a vertical cross-sectional view of the side turn signal lamp (a cross-sectional view taken along a line VII-VII in FIG. 3); FIG. 8 is an enlarged perspective view showing temporary fixing means between an extension reflector and a lamp body; FIG. 9 is a vertical cross-sectional view of the side turn signal lamp (an enlarged cross-sectional view taken along a line IX-IX in FIG. 7); and FIG. 10 is an enlarged perspective view showing a latch projection on a board holder side and an engagement hole on the extension reflector side, which are temporary fixing means of a circuit board unit.

In these figures, particularly FIGS. 2 and 3, a side mirror housing 10, which is made of synthetic resin, supports a side mirror body 16 (see FIG. 3). An opening portion 12, which extends in a left-right direction, is provided on an outer side in a vehicle width direction (i.e., on the left side in FIG. 2 and on the bottom side in FIG. 3) of a curved outer side wall 11 of the housing 10.

A side turn signal lamp 20 is fixed to the side mirror housing 10. The side turn signal lamp 20 is formed into a curved shape such that the entire shape thereof formed by a lamp body 22 and a front lens 26 follows (the opening portion 12 of) the curved outer side wall of the housing 11. The side turn signal lamp 20 also is assembled integrated with an inner side of the opening portion 12 and is structured such that a design surface (surface) 26a that expands farther forward than the front lens 26 (see FIGS. 3 to 7) projects forward from the opening portion 12 of the outer side wall 11. A sheet-like packing 14 is provided between the opening portion 12 of the outer side wall 11 and the front lens 26. A bracket 22a, having an attachment hole, is provided in the lamp body 22 of the side turn signal lamp 10. The bracket 22a is attached to an inner side of the housing outer side wall 11 by a fastening screw, which is not shown in the drawings.

The side turn signal lamp 20 includes a lamp chamber space S (see FIG. 3), which is defined by welding a sealing leg of the front lens 26 to a peripheral edge portion of the lamp body 22. The lamp chamber space S is curved and elongated in the left-right direction. A light guide inner lens 30 extends along the front lens 26 in the lamp chamber space S and has a rectangular cross section. A first LED 41 and a second LED 42 are behind the light guide inner lens 30. The first LED 41 is provided on a curved wrap-around side of the lamp chamber space such that an illumination axis L1 thereof faces diagonally rearward of the vehicle. The second LED 42 is provided adjacent to and on the inner side in the vehicle width direction of the first LED 41 such that an illumination axis L2 thereof faces diagonally forward of the vehicle.

As shown in FIG. 3, in an area of the light guide inner lens 30 corresponding to the first and second LEDs 41, 42, a concave portion (notch) 31 for light source installation is placed between the light incident surfaces 33, 34, which are generally opposite to the first and second LEDs 41, 42, respectively. A diffuse incident step 33a is formed on the light incident surface 33 corresponding to the first LED 41. Light emitted from the first LED 42, which is incident from the light incident surface 33, is distributed as diffused light diagonally rearward of the vehicle through the light guide inner lens 30 that mainly functions as a diffused lens. Meanwhile, a diffuse reflecting step 33b is formed on a back surface side of the light guide inner lens 30 extending from the concave portion (notch) 31 for light source installation to an end portion 30a on an inner side in the vehicle width direction. Light emitted from the second LED 42, which is incident from the light incident surface 34 to the light guide inner lens 30, is reflected by the diffuse reflecting step 33b on the back surface side. Thus, the entire light guide inner lens 30 emits light diagonally forward of the vehicle.

As described above, the light guide inner lens 30 is provided between the front lens 26 and the first and second LEDs 41, 42 used as the light source. Therefore, the first and second LEDs 41, 42 serving as the light source are not directly seen through the front lens 26 when not lit.

The first and second LEDs 41, 42 are provided in the concave portion (notch) 31 for light source installation of the light guide inner lens 30 (the first and second LEDs 41, 42 are provided forward of the back surface side of the light guide inner lens 30). In comparison to when the first and second LEDs 41, 42 are provided at positions along the curved back surface of the light guide inner lens 30, the installation position of the first and second LEDs 41, 42 is moved forward (i.e., closer to the front lens 26 side). Accordingly, the lamp chamber space S at the LED installation position does not expand rearward (i.e., the lamp body 22 does not significantly expand into the mirror housing 10).

An extension reflector 50 extends along the front lens 26, which is assembled to a front surface of the lamp body 21. A center opening portion 52 thereof extending in the left-right direction encloses the light guide inner lens 30. A surface of the extension reflector 50 including an inner surface of the center opening portion 52 is aluminized. The light guide inner lens 30 is edged with a band-like, metallic-colored, aluminized surface and seen through the transparent front lens 26. Thus, an overall appearance of the vehicular lamp is improved when the vehicular lamp is not lit. Light emitted from the back surface side of the light guide inner lens 30 is reflected by the aluminized inner surface of the center opening portion 12. The reflected light returns to the light guide inner lens 30, reducing light leakage.

The end portion 30a corresponding to the inner side in the vehicle width direction (i.e., the right side in FIG. 3) is engaged with a peripheral edge portion 52a of the center opening portion 52. Another end portion 30b side is pushed into the center opening portion 52. Accordingly, a convex-concave lance engagement between an engagement concave portion 30b1 formed on the other end portion 30b side and a peripheral edge portion 52b of the center opening portion 52 prevents the light guide inner lens 30 from separating from the center opening portion 52. Note that releasing the convex-concave lance engagement between the engagement concave portion 30b1 of the other end portion 30b side and the peripheral edge portion 52b enables easy separation of the light guide inner lens 50 from the center opening portion 52 of the extension reflector 50.

The center opening portion 52 of the extension reflector 50 includes upper and lower side walls 52c, 52d. The center opening portion 52 also includes a back wall 52e in an area that corresponds to the diffuse reflecting step 33b of the light guide inner lens 30, and thus the center opening portion 52 is formed into a C-shaped cross section that opens forward. A vertical rib 54 that continues into the upper and lower side walls 52c, 52d is formed in an area of the center opening portion 52 corresponding to the concave portion (notch) 31 for light source installation of the light guide inner lens 30.

As shown in FIGS. 4 to 7, a vertical cross section of the center opening portion 52 of the extension reflector 50 and the light guide inner lens 30 (i.e., a cross section perpendicular to the extending direction of the center opening portion 52 and the light guide inner lens 30) is formed into a rectangular shape, which is vertically longer toward the front surface side. As shown enlarged in FIG. 9, lateral ribs 53 for positioning in the up-down direction are provided at longitudinally predetermined intervals on the upper and lower side walls 52c, 52d of the center opening portion 52 so as to contact upper and lower side surfaces 30c, 30d of the light guide inner lens 30. At a position of the center opening portion 52 corresponding to the concave portion (notch) 31 for light source installation of the light guide inner lens 30, the vertical rib 54 (see FIG. 3) for positioning in the front-back direction is provided extending vertically across the center opening portion 52. The vertical rib 54 is also engaged with a thin wall portion 32 that defines the concave portion (notch) 31 for light source installation.

As described above, the vertical cross section of the center opening portion 52 of the extension reflector 50 and the light guide inner lens 30 is formed in a rectangular shape that is vertically longer toward the front surface side, which facilitates mounting (insertion) of the light guide inner lens 30 to the center opening portion 52.

The lateral ribs 53 provided on the upper and lower side walls 52c, 52d of the center opening portion 52 contact the upper and lower side surfaces 30c, 30d of the light guide inner lens 30 so as to prevent looseness in the up-down direction of the light guide inner lens 30 against the center opening portion 52. The vertical rib 54 provided in the center opening portion 52 is engaged with (contacts) the thin wall portion 32, which defines the concave portion (notch) 31 for light source installation of the light guide inner lens 30, so as to prevent looseness in the front-back direction of the light guide inner lens 30 against the center opening portion 52.

The light guide inner lens 30 made of synthetic resin has an elongated shape and is prone to deflection. Therefore, when the lamp is assembled (e.g., when a board holder 46 (a circuit board unit 40), which is integrated with circuit boards 43, 44 that are mounted with the first and second LEDs 41, 42, is assembled to the extension reflector 50 fitted to the light guide inner lens 30, or when the light guide inner lens 30 is fitted to the extension reflector 50 after the circuit board unit 40 is assembled to the extension reflector 50), a larger external force (force in the pushing direction) than necessary is applied to the light guide inner lens 30 and causes elastic deformation toward the back surface side in the vicinity of the curved center portion in the longitudinal direction of the light guide inner lens 30. Accordingly, the light guide inner lens 30 may contact the first and second LEDs 41, 42 provided on the back surface side of the light guide inner lens, and the illumination axes L1, L2 of the first and second LEDs 41, 42 may move (become displaced). In this embodiment, the vertical cross section of the light guide inner lens 30 and the center opening portion 52 is formed generally wedge-shaped (which is vertically longer toward the front surface side). In addition, the vertical rib 54 provided in the center opening portion 52 contacts the thin wall portion 32 that defines the concave portion (notch) 31 for light source installation of the light guide inner lens 30. Therefore, elastic deformation toward the back surface side of the light guide inner lens 30 is securely prevented, and the illumination axes L1, L2 of the first and second LEDs 41, 42 do not move (become displaced).

The circuit board unit 40 has a generally L-shaped horizontal cross section and is fitted to the back surface side of the extension reflector 50. In the circuit board unit 40, the board holder 46 is integrated with the circuit boards 43, 44 mounted with the first and second LEDs 41, 42. The circuit board unit 40 and the extension reflector 50 are integrated as an LED and extension unit U.

In other words, as shown in FIG. 3, a latch convex portion 46a is provided on an end portion on the curved side of the generally L-shaped board holder 46. A fastening screw insertion hole 46b is provided in a generally center portion in the longitudinal direction of the board holder 46. As shown in FIG. 7, a pair of latch projections 48 is provided at upper and lower positions of the screw insertion hole 46b so as to project outward in the up-down direction from upper and lower side edge portions of the board holder 46. The circuit board 44 integrated with a front surface of the board holder 46 is formed with a boss engagement hole 44a that has the same axis shape as the fastening screw insertion hole 46b of the board holder 46.

Meanwhile, as shown in FIG. 3, a latch concave portion 51 is provided on an end portion on the curved side of the extension reflector 50 and can engage with the latch convex portion 46a on the board holder 46 side. As shown in FIGS. 1 and 3, on the back surface side of the extension reflector 50, a boss 57 for providing a fastening screw is formed corresponding to the fastening screw insertion hole 47b. The boss 57 projects from the back wall 52e of the center opening portion. A pair of L-shaped tabs 56 extends rearward at upper and lower positions of the boss 57, as shown in FIGS. 7, 8, and 10. A horizontal extending portion 56a forms the base end portion of the L-shaped tab 56. The horizontal extending portion 56a also includes a projection engagement hole 58 capable of engaging with a latch projection 48 on the board holder 46 side and a projection guide groove 58a that extends in the front-back direction and communicates with the engagement hole 58. In FIG. 7, a screw mounting hole 57a is provided in the boss 57.

The latch convex portion 46a on the circuit board unit 40 side is engaged with the latch concave portion 51 on the extension reflector 50 side. The circuit board unit 40 is pushed into the back surface side of the extension reflector 50 so as to align the pair of latch projections 48 to the projection guide grooves 58a of the tabs 56. Accordingly, the boss engagement hole 44a engages with the boss 57, and the latch projection 48 slides along the projection guide groove 58a and engages with the projection engagement hole 58. Therefore, the circuit board unit 40 is integrated (temporarily fixed) with the extension reflector 50 so as to prevent separation from the extension reflector 50, and a fastening screw 59 is threadedly mounted to the screw mounting hole 57a of the boss 57 from the screw insertion hole 46a of the circuit board unit 40 (the board holder 46). Accordingly, the circuit board unit 40 can be easily fitted and integrated with the extension reflector 50.

As shown in FIGS. 1 and 8, a pair of upper and lower L-shaped tabs 56, 56 is formed on the back surface side in the generally center portion in the longitudinal direction of the extension reflector 50. A rearward extending projection 64 is formed in the vicinity of the lower end portion on the curved side of the extension reflector 50. A pair of upper and lower engagement projections 23, 23, which have a generally triangle-shaped cross section, and a concave portion 24 are formed on the front surface side of the lamp body 22. The pair of upper and lower engagement projections 23, 23 and the concave portion 24 are engaged with the tabs 56, 56 on the extension reflector 50 side and the rearward extending projection 64, respectively. The tabs 56, 56 are slidingly engaged with the engagement projections 23, 23 by sliding the LED and extension unit U (the extension reflector 50) from the outer side to the inner side in the vehicle width direction of the lamp body 22 (from the left side to the right side in FIG. 8). The rearward extending projection 64 is elastically engaged with the concave portion 24. Accordingly, the LED and extension unit U (the extension reflector 50) is assembled to the lamp body 22. In other words, the relative sliding surfaces of the extension reflector 50 and the lamp body 22 are provided with a convex-concave elastic engagement portion. The convex-concave elastic engagement portion is formed with the rearward extending projection 64 on the extension reflector 50 side and the concave portion 24 on the lamp body 22 side, which are elastically engaged with one another in cooperation with the engagement between the tab 56 and the engagement projection 23 so as to hold the tab 56 and the latch projection 23 in an engaged state.

As shown in FIGS. 1 and 8, reference numerals 25a, 25b are contact portions on the lamp body 22 side that contact positioning projections 55a, 55b on the extension reflector 50 side. At the same time that the tabs 56, 56 are engaged with the engagement projections 23, 23 and the rearward extending projection 64 with the concave portion 24, the positioning projections 55a, 55b contact the contact portions 25a, 25b. Reference numeral 25c is a screw hole matched to a screw insertion hole 55c on the extension reflector 50 side. The unit U (the extension reflector 50) is fitted and integrated with the lamp body 22 by a fastening screw 60 (see FIG. 1).

Therefore, at the same time that the pair of upper and lower L-shaped tabs 56, 56 on the extension reflector 50 back surface side is slidingly engaged with the pair of upper and lower engagement projections 23, 23 on the lamp body 22 front surface side, the rearward extending projection 64 on the extension reflector 50 side is elastically engaged with the concave portion 24 on the lamp body 22 side. Thus, the tab 56 and the engagement projection 23 are held in an engaged state (i.e., the LED and extension unit U is temporally fixed to the lamp body 22). Therefore, the fastening screw 60 is threadedly mounted to the screw hole 25c on the lamp body 22 side through the screw insertion hole 55c on the extension reflector 50 side so that the LED and extension unit U can be fitted and integrated with the lamp body 22.

When the engagement between the extension reflector 50 and the lamp body 22 (i.e., between the rearward extending projection 64 and the concave portion 24) is released, and the LED and extension unit U slides from the inner side to the outer side in the vehicle width direction of the lamp body 22 (i.e., slides in the opposite direction to the assembling direction), so that the pair of upper and lower tabs 56, 56 on the extension reflector 50 back surface side is released from the engagement projections 23, 23 on the lamp body 22 side. Therefore, the LED and extension unit U is easily separated from the lamp body 22.

While description has been made in connection with exemplary embodiments of the present invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF THE REFERENCE NUMERALS

10 Side Mirror Housing
11 Outer Side Wall Of Side Mirror Housing
12 Opening Portion
16 Side Mirror Body
20 Side Turn Signal Lamp
22 Lamp Body
23 Engagement Projection
24 Engagement Concave Portion
26 Front Lens
S Lamp Chamber Space
30 Light Guide Inner Lens
30a End Portion Of Light Guide Inner Lens Corresponding To Inner Side In Vehicle Width Direction
30b1 Concave Portion Formed On Another End Portion Side Of Light Guide Inner Lens (Convex-Concave Lance Engagement Portion)
31 Concave Portion (Notch) For Light Source Installation
32 Thin Wall Portion
33,34 Light Incident Surface
33a Diffuse Incident Step
33b Diffuse Reflecting Step
40 Circuit Board Unit
41 First Led
L1 Illumination Axis Of First Led
42 Second Led
L2 Illumination Axis Of Second Led
43 Circuit Board Mounted With First Led
44 Circuit Board Mounted With Second Led
44a Boss Engagement Hole
46 Board Holder
46a Latch Convex Portion On Board Holder Side
46b Screw Insertion Hole
48 Engagement Projection
U Led And Extension Unit
50 Extension Reflector
51 Latch Concave Portion On Extension Reflector Side
52 Center Opening Portion
52b Peripheral Edge Portion Of Center Opening Portion (Convex-Concave Lance Engagement Portion)
52c Upper Side Wall Of Center Opening Portion
52d Lower Side Wall Of Center Opening Portion
52e Back Wall Of Center Opening Portion
53 Lateral Rib
54 Longitudinal Rib
56 L-Shaped Tab
56a Horizontal Extending Portion
57 Boss
58 Projection Engagement Hole
58a Projection Guide Groove
59 Fastening Screw
60 Fastening Screw

What is claimed is:

1. A vehicular lamp with an opening portion extending in a left-right direction provided on a side that wraps around toward a rear of a vehicle on an end side of an outer side wall of a mirror housing that supports a side mirror body, the vehicular lamp comprising:
    a main lamp body comprising a lamp body and a front lens, wherein the main lamp body is formed into a shape that generally follows the opening portion, and wherein the front lens is attached to the mirror housing so as to slightly project from or be on generally the same plane as the opening portion;
    a surface-emitting light guide inner lens provided along the front lens in a curved lamp chamber space, wherein the lamp chamber space is defined by the lamp body and the front lens, and wherein the lamp chamber space is elongated in the left-right direction; and
    an LED used as a light source provided behind the light guide inner lens,
    wherein the LED is formed from:
        a first LED provided on the curved wrap-around side of the lamp chamber space such that an illumination axis thereof faces diagonally rearward of the vehicle, and
        a second LED provided adjacent to and on an inner side in a vehicle width direction of the first LED such that an illumination axis thereof faces diagonally forward of the vehicle, and
    wherein a concave portion for light source installation is provided in an area of the light guide inner lens corresponding to the first and second LEDs, and respectively forms light incident surfaces generally opposite to the first and second LEDs.

2. The vehicular lamp according to claim 1,
    wherein the light guide inner lens is assembled on a front side of the lamp body,
    wherein the light guide inner lens is structured so as to be enclosed by a center opening portion extending in the left-right direction of an extension reflector extending along the front lens,
    wherein the light guide inner lens is held to the center opening portion by a convex-concave lance engagement between an engagement concave portion formed on an end portion and a peripheral edge portion of the center opening portion, and
    wherein the convex-concave lance engagement occurs when another end portion corresponding to the inner side in the vehicle width direction is engaged with the peripheral edge portion of the center opening portion, and the end portion side is pushed into the center opening portion.

3. The vehicular lamp according to claim 2,
    wherein a vertical cross section of the center opening portion of the extension reflector and the light guide inner lens is formed into a rectangular shape that is vertically longer toward the front surface side, wherein a lateral rib for positioning in an up-down direction is provided at a predetermined interval in the left-right direction on upper and lower side walls of the center opening portion so as to contact upper and lower side surfaces of the light guide inner lens, and wherein a vertical rib for positioning in a front-back direction is provided at a predetermined position in the left-right direction of the center opening portion so as to be engaged with a thin wall portion that defines the concave portion for light source installation.

4. The vehicular lamp according to claim 2 further comprising:

a circuit board holder that is integrated with circuit boards mounted with the first and second LEDs, wherein the circuit board holder has a generally L-shaped horizontal cross section following the light guide inner lens, wherein the circuit board holder is fitted on a back surface side of the extension reflector, such that the circuit board holder and the extension reflector are integrated as an LED and extension unit, wherein a pair of upper and lower L-shaped tabs is formed on the back surface side of the extension reflector, wherein a pair of upper and lower engagement projections engaged with the tabs is formed on the front surface side of the lamp body, wherein the engagement projections are slidingly engaged with the tabs by sliding the LED and extension unit from an outer side to an inner side in the vehicle width direction of the lamp body such that the LED and extension unit is assembled to the lamp body, and wherein relative sliding surfaces of the extension reflector and the lamp body are provided with a convex-concave engagement portion that is elastically engaged in cooperation with the engagement between the tabs and the engagement projections so as to hold the tabs and the latch projections in an engaged state.

5. The vehicular lamp according to claim 4, wherein a fastening screw insertion hole is provided in a generally center portion in the longitudinal direction of the generally L-shaped circuit board holder, wherein the generally L-shaped circuit board holder is provided with a latch convex portion on an end portion of a curved side thereof, wherein a pair of latch projections projecting outward in the up-down direction is provided at upper and lower positions of the screw insertion hole, wherein a boss, for providing a fastening screw corresponding to the fastening screw insertion hole, is formed projecting from a back wall of the center opening portion on the back surface side of the extension reflector, wherein a latch concave potion is provided for engagement with the latch convex portion on the end portion of the curved side of the generally L-shaped circuit board holder, wherein a horizontal extending portion provided at upper and lower positions of the boss forms a base end portion of the pair of L-shaped tabs, wherein the horizontal extending portion is provided with: a projection engagement hole capable of engaging with the latch projection, and a projection guide groove that extends in the front-back direction and communicates with the engagement hole, and wherein the generally L-shaped circuit board holder integrated with the circuit boards mounted with the first and second LEDs is structured so as to be temporarily fixed to the extension reflector by engaging the latch convex portion and the latch concave portion, and engaging the latch projection and the projection engagement hole.

6. The vehicular lamp according to claim 3 further comprising:

a circuit board holder that is integrated with circuit boards mounted with the first and second LEDs, wherein the circuit board holder has a generally L-shaped horizontal cross section following the light guide inner lens, wherein the circuit board holder is fitted on a back surface side of the extension reflector, such that the circuit board holder and the extension reflector are integrated as an LED and extension unit, wherein a pair of upper and lower L-shaped tabs is formed on the back surface side of the extension reflector, wherein a pair of upper and lower engagement projections engaged with the tabs is formed on the front surface side of the lamp body, wherein the engagement projections are slidingly engaged with the tabs by sliding the LED and extension unit from an outer side to an inner side in the vehicle width direction of the lamp body such that the LED and extension unit is assembled to the lamp body, and wherein relative sliding surfaces of the extension reflector and the lamp body are provided with a convex-concave engagement portion that is elastically engaged in cooperation with the engagement between the tabs and the engagement projections so as to hold the tabs and the latch projections in an engaged state.

7. The vehicular lamp according to claim 6, wherein a fastening screw insertion hole is provided in a generally center portion in the longitudinal direction of the generally L-shaped circuit board holder, wherein the generally L-shaped circuit board holder is provided with a latch convex portion on an end portion of a curved side thereof, wherein a pair of latch projections projecting outward in the up-down direction is provided at upper and lower positions of the screw insertion hole, wherein a boss, for providing a fastening screw corresponding to the fastening screw insertion hole, is formed projecting from a back wall of the center opening portion on the back surface side of the extension reflector, wherein a latch concave potion is provided for engagement with the latch convex portion on the end portion of the curved side of the generally L-shaped circuit board holder, wherein a horizontal extending portion provided at upper and lower positions of the boss forms a base end portion of the pair of L-shaped tabs, wherein the horizontal extending portion is provided with: a projection engagement hole capable of engaging with the latch projection, and a projection guide groove that extends in the front-back direction and communicates with the engagement hole, and wherein the generally L-shaped circuit board holder integrated with the circuit boards mounted with the first and second LEDs is structured so as to be temporarily fixed to the extension reflector by engaging the latch convex portion and the latch concave portion, and engaging the latch projection and the projection engagement hole.

8. A method of manufacturing a vehicular lamp with an opening portion extending in a left-right direction provided on a side that wraps around toward a rear of a vehicle on an end side of an outer side wall of a mirror housing that supports a side mirror body, the method comprising:
  forming the main lamp body into a shape that generally follows the opening portion, wherein the main lamp body comprises a lamp body and a front lens;
  attaching the front lens to the mirror housing so as to slightly project from or be on generally the same plane as the opening portion;
  providing a surface-emitting light guide inner lens along the front lens in a curved lamp chamber space, wherein the lamp chamber space is defined by the lamp body and the front lens, and wherein the lamp chamber space is elongated in the left-right direction; and
  providing an LED used as a light source behind the light guide inner lens;
  wherein the LED is formed from:
    a first LED provided on the curved wrap-around side of the lamp chamber space such that an illumination axis thereof faces diagonally rearward of the vehicle, and
    a second LED provided adjacent to and on an inner side in a vehicle width direction of the first LED such that an illumination axis thereof faces diagonally forward of the vehicle, and
  wherein a concave portion for light source installation is provided in an area of the light guide inner lens corresponding to the first and second LEDs, and respectively forms light incident surfaces generally opposite to the first and second LEDs.

9. The method according to claim 8 further comprising:
  assembling the light guide inner lens on a front side of the lamp body; and
  structuring the light guide inner lens so as to be enclosed by a center opening portion extending in the left-right direction of an extension reflector extending along the front lens,
  wherein the light guide inner lens is held to the center opening portion by a convex-concave lance engagement between an engagement concave portion formed on an end portion and a peripheral edge portion of the center opening portion, and
  wherein the convex-concave lance engagement occurs when another end portion corresponding to the inner side in the vehicle width direction is engaged with the peripheral edge portion of the center opening portion, and the end portion side is pushed into the center opening portion.

10. The method according to claim 9 further comprising:
  forming a vertical cross section of the center opening portion of the extension reflector and the light guide inner lens into a rectangular shape that is vertically longer toward the front surface side, providing a lateral rib for positioning in an up-down direction at a predetermined interval in the left-right direction on upper and lower side walls of the center opening portion so as to contact upper and lower side surfaces of the light guide inner lens, and providing a vertical rib for positioning in a front-back direction at a predetermined position in the left-right direction of the center opening portion so as to be engaged with a thin wall portion that defines the concave portion for light source installation.

11. The method according to claim 9,
  wherein a circuit board holder is integrated with circuit boards mounted with the first and second LEDs,
  wherein the circuit board holder has a generally L-shaped horizontal cross section following the light guide inner lens,
  the method further comprising:
    fitting the circuit board holder on a back surface side of the extension reflector, such that the circuit board holder and the extension reflector are integrated as an LED and extension unit;
    forming a pair of upper and lower L-shaped tabs on the back surface side of the extension reflector; and
    forming a pair of upper and lower engagement projections engaged with the tabs on the front surface side of the lamp body,
  wherein the engagement projections are slidingly engaged with the tabs by sliding the LED and extension unit from an outer side to an inner side in the vehicle width direction of the lamp body such that the LED and extension unit is assembled to the lamp body, and
  wherein relative sliding surfaces of the extension reflector and the lamp body are provided with a convex-concave engagement portion that is elastically engaged in cooperation with the engagement between the tabs and the engagement projections so as to hold the tabs and the latch projections in an engaged state.

12. The method according to claim 11 further comprising:
  providing a fastening screw insertion hole in a generally center portion in the longitudinal direction of the generally L-shaped circuit board holder;
  providing the generally L-shaped circuit board holder with a latch convex portion on an end portion of a curved side thereof;
  providing a pair of latch projections projecting outward in the up-down direction at upper and lower positions of the screw insertion hole;
  forming a boss, for providing a fastening screw corresponding to the fastening screw insertion hole, projecting from a back wall of the center opening portion on the back surface side of the extension reflector;
  providing a latch concave potion for engagement with the latch convex portion on the end portion of the curved side of the generally L-shaped circuit board holder,
  wherein a horizontal extending portion provided at upper and lower positions of the boss forms a base end portion of the pair of L-shaped tabs,
  wherein the horizontal extending portion is provided with: a projection engagement hole capable of engaging with the latch projection, and a projection guide groove that extends in the front-back direction and communicates with the engagement hole, and
  wherein the generally L-shaped circuit board holder integrated with the circuit boards mounted with the first and second LEDs is structured so as to be temporarily fixed to the extension reflector by engaging the latch convex portion and the latch concave portion, and engaging the latch projection and the projection engagement hole.

13. The vehicular lamp according to claim 10,
  wherein a circuit board holder is integrated with circuit boards mounted with the first and second LEDs,
  wherein the circuit board holder has a generally L-shaped horizontal cross section following the light guide inner lens,
  the method further comprising:
    fitting the circuit board holder on a back surface side of the extension reflector, such that the circuit board holder and the extension reflector are integrated as an LED and extension unit;
    forming a pair of upper and lower L-shaped tabs on the back surface side of the extension reflector; and
    forming a pair of upper and lower engagement projections engaged with the tabs on the front surface side of the lamp body, wherein the engagement projections are slidingly engaged with the tabs by sliding the LED and extension unit from an outer side to an inner side in the vehicle width direction of the lamp body such that the LED and extension unit is assembled to the lamp body, and wherein relative sliding surfaces of the extension reflector and the lamp body are provided with a convex-concave engagement portion that is elastically engaged in cooperation with the engagement between the tabs and the engagement projections so as to hold the tabs and the latch projections in an engaged state.

14. The method according to claim 13 further comprising:
providing a fastening screw insertion hole in a generally center portion in the longitudinal direction of the generally L-shaped board holder;
providing the generally L-shaped board holder with a latch convex portion on an end portion of a curved side thereof;
providing a pair of latch projections projecting outward in the up-down direction at upper and lower positions of the screw insertion hole;
forming a boss, for providing a fastening screw corresponding to the fastening screw insertion hole, projecting from a back wall of the center opening portion on the back surface side of the extension reflector;
providing a latch concave potion for engagement with the latch convex portion on the end portion of the curved side of the generally L-shaped circuit board holder,
wherein a horizontal extending portion provided at upper and lower positions of the boss forms a base end portion of the pair of L-shaped tabs,
wherein the horizontal extending portion is provided with:
a projection engagement hole capable of engaging with the latch projection, and
a projection guide groove that extends in the front-back direction and communicates with the engagement hole, and
wherein the generally L-shaped circuit board holder integrated with the circuit boards mounted with the first and second LEDs is structured so as to be temporarily fixed to the extension reflector by engaging the latch convex portion and the latch concave portion, and engaging the latch projection and the projection engagement hole.

* * * * *